Jan. 17, 1933.  H. E. KEMPTON  1,894,353
ROTARY ENGINE
Filed Sept. 14, 1929
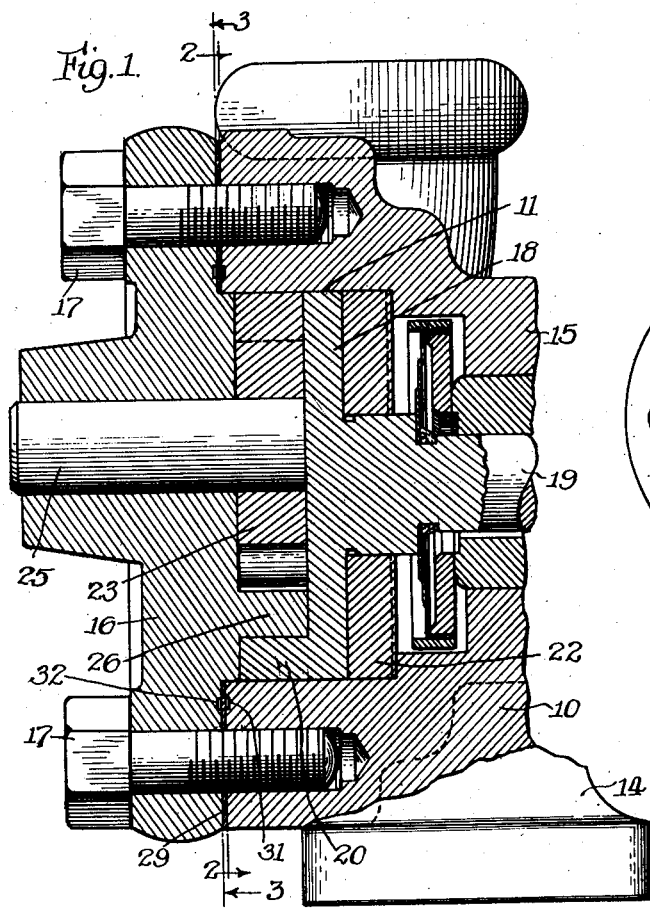
Fig. 1.
Fig. 2.
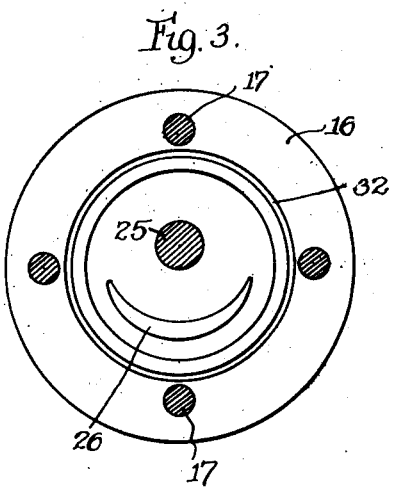
Fig. 3.
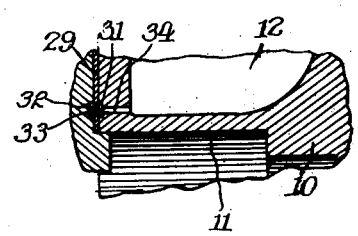
Fig. 4.
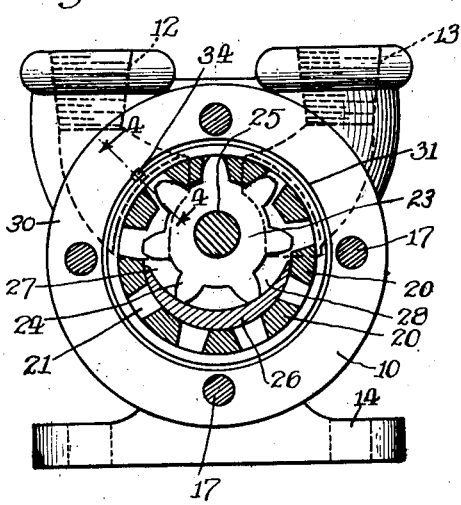
Inventor:
Herbert E. Kempton,
By Chindahl Parker Carlow
Attys.

Patented Jan. 17, 1933

1,894,353

UNITED STATES PATENT OFFICE

HERBERT E. KEMPTON, OF CHICAGO, ILLINOIS, ASSIGNOR TO TUTHILL PUMP COMPANY, OF CHICAGO, ILLINOIS, A CORPORATION OF ILLINOIS

ROTARY ENGINE

Application filed September 14, 1929. Serial No. 392,636.

The present invention relates to improvements in rotary engines, and has particular reference to rotary gear pumps of the general type disclosed in my copending application Ser. No. 319,217, filed November 14, 1928.

Gear pumps of this type commonly comprise a body having a cylindrical chamber open at one end, spaced inlet and discharge passages opening into the chamber, rotary gear means in the chamber for carrying fluid from one passage to the other, and a removable cover plate for closing the outer end of said chamber. In practice, the gear means is confined against endwise movement between the inner end of the chamber and the cover plate, and close end clearances are provided to maintain the necessary seal between the passages.

Heretofore, considerable difficulty has been encountered in preventing leakage between the body and the cover plate, particularly when light fluids, such as light oils, are handled. As a result, it is extremely difficult to maintain the fluid under high pressures, and where oil is handled, the leakage creates a bad fire hazard.

A gasket is commonly interposed between the body and the cover plate for the purpose of preventing leakage. While leakage can be substantially prevented by the use of a thick gasket, such gasket is not commercial and is unsatisfactory. Thus, a thick gasket is compressible and is subject to change upon changes in temperatures, and hence will not maintain the necessary end clearances, thereby resulting in binding of the relatively movable parts. This difficulty is particularly pronounced in small oil pumps where the clearances are especially small. If the gasket is fibrous, it is practically impossible to prevent leakage by capillary action. A thin gasket on the other hand will not prevent leakage.

The primary object of the present invention therefore resides in the provision of a new and improved packing adapted to prevent leakage between the body and cover plate of a gear pump or engine without affecting the end clearances of the relatively movable parts and without lowering the efficiency of the pumping action.

A more specific object resides in the provision of novel means for preventing leakage between the body and cover plate of the pump, said means comprising a thin metal gasket, and means for automatically venting opposite sides of said gasket to the suction side of the pump so as to prevent leakage.

Further objects and advantages will become apparent as the description proceeds.

In the accompanying drawing, Fig. 1 is an axial fragmentary sectional view of a pump embodying the features of my invention.

Fig. 2 is an end view of the pump with the cover plate and gasket removed.

Fig. 3 is an inner face view of the cover plate.

Fig. 4 is a fragmentary sectional view taken along line 4—4 of Fig. 2.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

While the invention is not limited in its applicability to any particular type of pump, it is particularly adapted for and is therefore described in connection with a rotary gear pump. In the present instance, the pump constituting the exemplary embodiment of the invention comprises a suitable casing 10 which preferably is cylindrical in form to provide an inner cylindrical chamber 11. Suitable inlet and outlet passages 12 and 13 respectively, are formed in the casing 10 and open to opposite sides of the chamber 11. Preferably the casing 10 is formed integral with a suitable support 14, and with a bearing 15 on one end constituting a closed integral head for the inner end of the chamber 11. The other end of the chamber 11 is closed by a removable head or cover plate 16 suitably held in place by means of a plurality of bolts 17.

Rotatably mounted in the chamber 11 and in close peripheral bearing contact therewith is a rotor 18 having a suitable coaxial drive shaft 19 projecting rearwardly therefrom through the bearing 15 for connection to a suitable source of power (not shown). In the present instance, the rotor 18 is formed on its front end with a plurality of peripherally spaced internal gear teeth or vanes 20 separated by interdental spaces 21. Rigidly mounted in the inner end of the chamber 11 in bearing engagement with the inner end of the rotor 18 is a suitable bearing plate 22. The free outer ends of the vanes 20 bear against the cover plate 16.

Eccentrically related to the rotor 18 and in mesh with the vanes 20 is a pinion 23 having suitable teeth or vanes 24. The pinion 23 is mounted for rotation on a pin 25 projecting inwardly from the cover plate 16. Disposed between the rotor 18 and the pinion 23 is a crescent cut-off partition 26 which preferably is formed integral with the cover plate 16.

It will be evident that upon driving of the rotor 18 in a counter-clockwise direction, fluid, such as oil, will be carried from the inlet side 27 to the outlet side 28 of the chamber 11. It is essential in order to obtain an efficient action and to maintain a high pressure in the outlet side 28 of the casing 10 that leakage past the relatively movable parts be substantially prevented. Hence relatively small end clearances are provided between the rotor 18 on one hand and the plates 16 and 22 on the other hand.

An important feature of the present invention resides in the provision of means for preventing the outward leakage of fluid between the end of the casing 10 and the cover plate 16. To this end, a gasket 29 is interposed between these parts. Preferably, the gasket 29 is made of a thin and but slightly compressible material, such as copper, so that the proper end clearances will be maintained.

Formed in the end face 30 of the casing 10 is an annular groove 31. A similar groove 32 is formed directly opposite the groove 31 in the inner face of the cover plate 16. The opposed grooves 31 and 32 open to the opposite sides of the gasket 29, and serve to collect any fluid tending to leak past the gasket. These grooves obviously will interrupt any leak lines that may tend to form along the gasket, and any fluid collecting therein will tend to improve the seal. A suitable number of apertures, in the present instance one aperture 33, is formed in the gasket for the purpose of establishing communication between the grooves 31 and 32.

One of the grooves, in the present instance the groove 31, is connected directly to a source of relatively low pressure for the purpose of exhausting any fluid that may collect in the grooves 31 and 32. To this end, the groove 31 is connected by a suitable duct 34 formed in the body of the casing 10 to the inlet or suction passage 12.

It will be evident that I have provided a novel means for preventing leakage of fluid from the pump chamber outwardly between the body and the cover plate. This means although serving to prevent leakage, does not influence the size of the end clearances between the relatively movable parts. As a result the pump is always efficient in operation. The packing means is particularly adapted to small oil pumps in which relatively small clearances are provided and where the leakage of oil is particularly objectionable due to the resulting fire hazard. Since the parts forming the pumping chamber 11 are hermetically sealed and since the proper clearances are obtained, relatively high pressures can be easily maintained in the outlet passage 13.

I claim as my invention:

1. A pump comprising, in combination, a casing having a chamber open at one end and having spaced inlet and discharge passages opening to said chamber, a removable cover plate closing said chamber, rotary fluid transmission means in said chamber, and a thin metallic gasket interposed between said casing and said cover plate, said casing and said cover plate being formed respectively with opposed shallow annular grooves opening along opposite sides of said gasket, said gasket being formed with an aperture establishing communication between said grooves, said casing being formed with a duct connecting the groove therein to said inlet passage.

2. A pump comprising, in combination, a casing having a chamber open at one end and having spaced inlet and discharge passages opening to said chamber, a removable cover closing said chamber, rotary fluid transmission means in said chamber, an annular packing interposed between said casing and said cover, a plurality of headed screw devices passing through apertures in said cover and into screw threaded engagement with said casing for securing the cover to the casing, opposed annular grooves formed respectively in said casing and said cover spaced from said screw device apertures and opening to said packing, means establishing communication between said grooves, and a duct connecting one of said grooves to said inlet passage.

3. A pump comprising, in combination, a casing having a chamber open at one end and having spaced inlet and discharge passages opening to said chamber, a removable cover closing said chamber, rotary fluid transmission means in said chamber, a packing interposed between said casing and said cover, an annular groove formed in one of the parts contacting with said gasket and opening peripherally to said gasket intermediate the peripheral margins of said gasket, and a duct connecting said groove to said inlet passage.

4. A leak-proof seal for a pump or the like having a hollow open-sided casing, a closure member therefor and headed screws passing through circumferentially spaced apertures in said closure member for securing said closure member to the casing, comprising, in combination, continuous complementary and opposed annular grooves formed in the meeting faces of said casing and closure member and spaced from said screws, a relatively thin and substantially incompressible packing member interposed between said meeting faces and separating said grooves, and one or more passageways connecting said grooves.

In testimony whereof, I have hereunto affixed my signature.

HERBERT E. KEMPTON.